United States Patent
Han et al.

(10) Patent No.: US 11,290,800 B2
(45) Date of Patent: Mar. 29, 2022

(54) WEARABLE ELECTRONIC DEVICE WITH WATER REPELLENT STRUCTURE USING SPEAKER MODULE AND METHOD FOR SENSING MOISTURE PENETRATION THEREOF

(71) Applicant: Samsung Electronics Co., Ltd., Gyeonggi-do (KR)

(72) Inventors: Byunggon Han, Gyeonggi-do (KR); Jaejoon Yoo, Gyeonggi-do (KR); Seunghyun Hwang, Gyeonggi-do (KR); Hansol Kim, Gyeonggi-do (KR); Seungnyun Kim, Gyeonggi-do (KR); Yongsang Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/053,885

(22) PCT Filed: Apr. 24, 2019

(86) PCT No.: PCT/KR2019/004965
§ 371 (c)(1),
(2) Date: Nov. 9, 2020

(87) PCT Pub. No.: WO2019/216579
PCT Pub. Date: Nov. 14, 2019

(65) Prior Publication Data
US 2021/0250672 A1    Aug. 12, 2021

(30) Foreign Application Priority Data

May 10, 2018 (KR) .......... 10-2018-0053644

(51) Int. Cl.
*H04R 25/00*  (2006.01)
*H04R 1/10*  (2006.01)
*G06F 1/16*  (2006.01)

(52) U.S. Cl.
CPC ......... *H04R 1/1016* (2013.01); *G06F 1/1656* (2013.01); *G06F 1/1683* (2013.01); *H04R 1/1066* (2013.01)

(58) Field of Classification Search
CPC ........ H04R 1/086; H04R 3/007; H04R 29/00; H04R 2499/11
See application file for complete search history.

(56) References Cited

U.S. PATENT DOCUMENTS

| 2009/0101476 A1 | 4/2009 | Zorn et al. |
| 2015/0163572 A1 | 6/2015 | Weiss et al. |

(Continued)

FOREIGN PATENT DOCUMENTS

| JP | 2009-107844 A | 5/2009 |
| KR | 10-2016-0012436 A | 2/2016 |

(Continued)

Primary Examiner — Amir H Etesam
(74) Attorney, Agent, or Firm — Cha & Reiter, LLC.

(57) ABSTRACT

The present disclosure may disclosure an electronic device having a water repellent structure. The disclosure electronic device may include: a housing; a speaker module disposed inside the housing and coupled to the outside of the electronic device; a sensing module disposed inside the housing and coupled to the outside of the electronic device; and a processor coupled to the sensing module and the speaker module. The processor may be configured to determine whether foreign matter is present via the sensing module, and output a signal of a specified frequency range via the speaker module so that at least part of the foreign matter moves to the outside, based on the sensing result.

14 Claims, 9 Drawing Sheets

(56) References Cited

U.S. PATENT DOCUMENTS

| | | | |
|---|---|---|---|
| 2015/0319534 A1* | 11/2015 | Lippert | H04R 3/007 |
| | | | 381/165 |
| 2016/0058375 A1 | 3/2016 | Rothkopf | |
| 2017/0133002 A1 | 5/2017 | Jung | |
| 2018/0369847 A1 | 12/2018 | Kihm et al. | |

FOREIGN PATENT DOCUMENTS

| | | |
|---|---|---|
| KR | 10-2016-0089459 A | 7/2016 |
| KR | 10-2017-0055329 A | 5/2017 |
| KR | 10-2017-0103618 A | 9/2017 |

* cited by examiner

WEARABLE ELECTRONIC DEVICE WITH WATER REPELLENT STRUCTURE USING SPEAKER MODULE AND METHOD FOR SENSING MOISTURE PENETRATION THEREOF

CROSS-REFERENCE TO RELATED APPLICATION(S)

This application is a National Phase Entry of PCT International Application No. PCT/KR2019/004965, which was filed on Apr. 24, 2019, and claims priority to Korean Patent Application No. 10-2018-0053644, which was filed on May 10, 2018, the contents of which are incorporated herein by reference.

TECHNICAL FIELD

Various embodiments of the present disclosure relate to a water repellent structure of an electronic device.

BACKGROUND ART

Electronic devices (e.g., a mobile terminal, a smartphone, a wearable device, etc.) may provide various functions. For example, in addition to a basic voice communication function, the smartphone may provide a short-range wireless communication (Bluetooth, Wireless Fidelity (Wi-Fi), Near Field Communication (NEC), etc.) function, a mobile communication ($3^{rd}$ Generation (3G), $4^{th}$ Generation (4G), $5^{th}$ Generation (5G), etc.) function, a music or video playback function, a shooting function, a navigation function, or the like.

Electronic devices for portable purposes are generally equipped with a flat-panel display device and a battery, and have a bar-type, folder-type, a sliding-type exterior. Recently, with the development of the electronic communication technology, the electronic devices have been small in size, thereby commercializing a wearable electronic device that can be worn on part of a body such as a wrist or a head.

The wearable electronic device may have a structure constructed to be light in weight so as to be easily worn, as an electronic device that can be worn on a specific portion of the body, for example, an ear, a neck, an arm, a wrist, or the like.

DISCLOSURE OF INVENTION

Technical Problem

However, in a living environment using an electronic device, when a waterproof environment is required, for example, when the electronic device is washed in water or is used by being worn in a swimming pool, moisture may penetrate to an acoustic conduit of a speaker and microphone of the electronic device.

Various embodiments of the present disclosure may provide an electronic device including a water repellent structure capable of detecting whether moisture penetrates to an acoustic conduit by using a microphone, in a wearable electronic device that can be worn on an ear and in which the microphone and a speaker (receiver) are integrally constructed.

Various embodiments of the present disclosure may provide an electronic device including a water repellent structure capable of discharging moisture which has penetrated to an acoustic conduit, in a wearable electronic device that can be worn on an ear.

Various embodiments of the present disclosure may provide an electronic device including a water repellent structure capable of detecting moisture penetration by using a microphone and discharging penetrated moisture through an output (vibration) of a speaker.

Various embodiments of the present disclosure may provide an electronic device including a water repellent structure capable of detecting moisture which has penetrated to an acoustic conduit by using an acoustic component.

Various embodiments of the present disclosure may provide an electronic device including a water repellent structure capable of discharging, at a time, moisture stagnated in an acoustic conduit of a microphone and/or an acoustic conduit of a speaker through an output of the speaker.

Solution to Problem

An electronic device according to various embodiments of the present disclosure may include: a housing; a speaker module disposed inside the housing and coupled to the outside of the electronic device; a sensing module disposed inside the housing and coupled to the outside of the electronic device; and a processor coupled to the sensing module and the speaker module. The processor may be configured to determine whether foreign matter is present via the sensing module, and output a signal of a specified frequency range via the speaker module so that at least part of the foreign matter moves to the outside, based on the sensing result.

Advantageous Effects of Invention

In the present disclosure, moisture which has penetrated to an acoustic conduit can be detected by using an acoustic component in a wearable electronic device that can be worn on an ear.

In addition, in the present disclosure, moisture which have penetrated to each of a first acoustic conduit and/or a second acoustic conduit can be discharged at a time to the outside through an output (e.g., vibration) of a first acoustic component.

BEST MODE FOR CARRYING OUT THE INVENTION

Hereinafter, various embodiments of the disclosure are described with reference to the accompanying drawings. However, it should be appreciated that this is not intended to limit the technological features set forth herein to particular embodiments and include various changes, equivalents, or replacements for an embodiment of the disclosure. With regard to the description of the drawings, similar reference numerals may be used to refer to similar or related elements.

Hereinafter, various embodiments of the present disclosure will be described with reference to the accompanying drawings.

Figure 1:
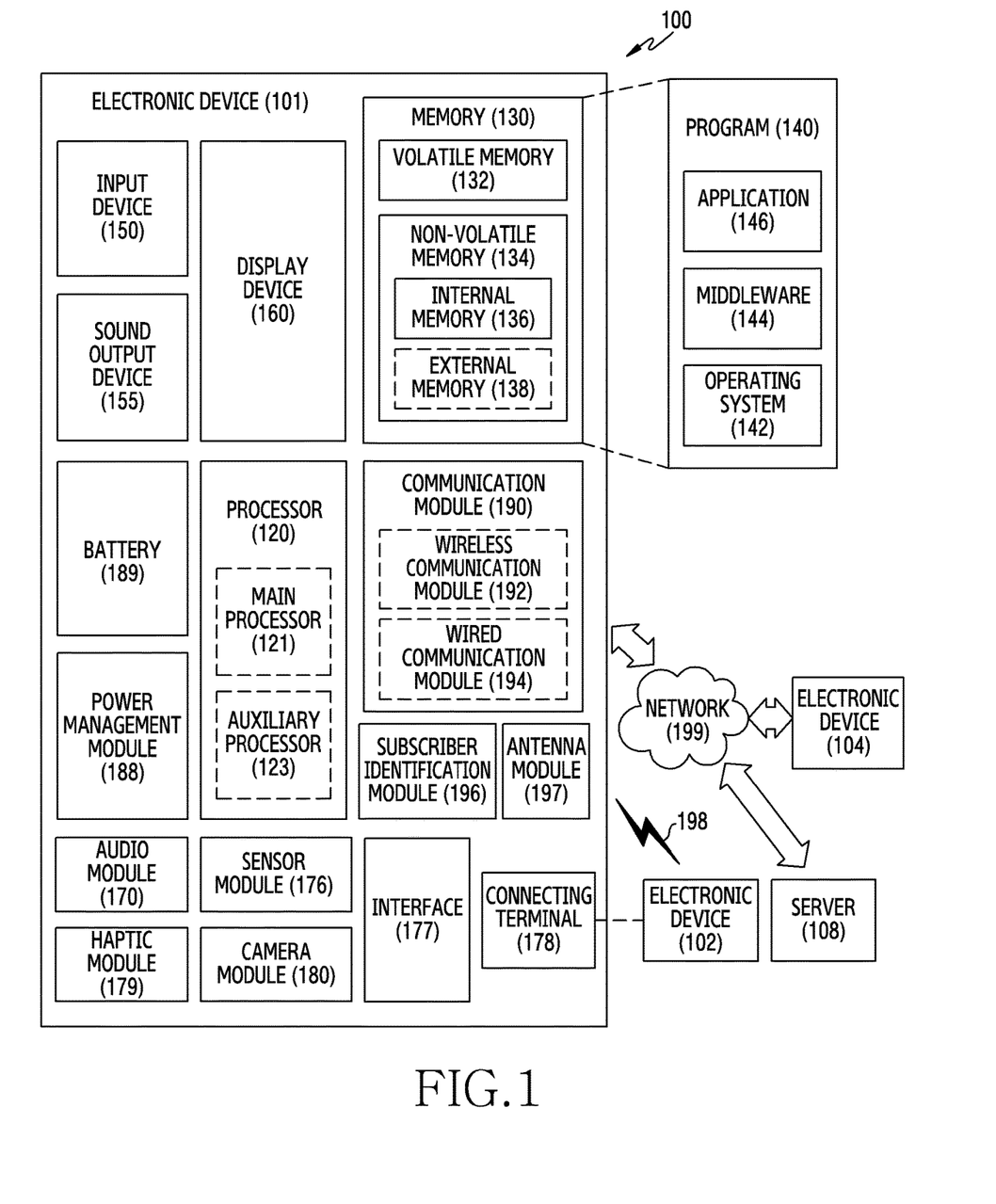
FIG. 1 is a block diagram illustrating an electronic device having a water repellent structure using a speaker module to detect moisture penetration in a network environment according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
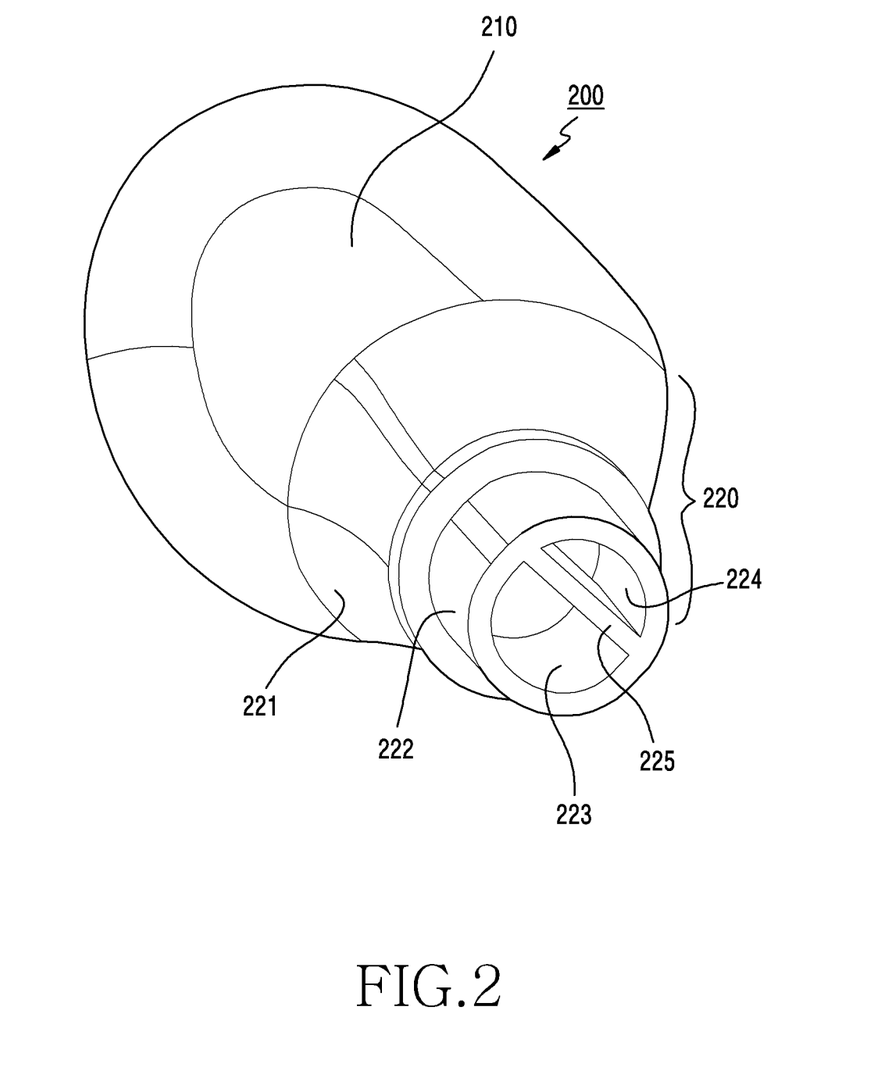
FIG. 2 is a perspective view illustrating a wearable electronic device in which an ear mold is removed according to various embodiments of the present disclosure.

FIG. 2 is a perspective view illustrating a wearable electronic device 200 in which an ear mold is removed according to various embodiments of the present disclosure.

Referring to FIG. 2, an electronic device according to various embodiments is the wearable electronic device 200, which may be a wearable electronic device to be worn on an ear. For example, the wearable electronic device 200 to be worn on the ear may include a wired or wireless headset or earphone. The wearable electronic device 200 is a lightweight wearable device, which may be an electronic device to be worn on the ear. The wearable electronic device 200 may be constructed to be light in weight, so that penetrated moisture can be discharged through an output of an acoustic component. For example, the wearable electronic device 200 may be light in weight, and may have a weight of approximately 7 g or less. The wearable electronic device may have to be constructed to be light in weight because a water repellent operation may be effective (possible).

The wearable electronic device 200 according to various embodiments may include a housing for mounting various electronic components thereon. The housing may include a main body 210 and a neck portion 220. For example, when the wearable electronic device 200 is worn on the ear, the main body 210 may be a component accommodating portion in which a plurality of acoustic components are disposed outside the ear. The neck portion 220 is a portion inserted inside an ear, and may be a portion extending to be gradually thinly from the main body 210 in a conduit shape. As will be described later, an ear mold (e.g., an ear module 250 of FIG. 3) of a flexible material may be coupled to the neck portion 220, so that the wearable electronic device 200 can be smoothly worn inside the ear.

The neck portion 220 according to various embodiments may be isolated into first and second acoustic conduits 223, 224, and 226 by means of a partition wall 225. The first acoustic conduit 223 is a conduit-shaped opening, which may be an acoustic conduit of a first acoustic component (e.g., a first acoustic component 230 of FIG. 3) and a moisture penetration path through which moisture can penetrate. The first acoustic conduit 223 may be referred to as a first acoustic guide opening or a first acoustic path or the like. The second acoustic conduits 224 and 226 are conduit-type openings, which may be acoustic conduits of a second acoustic component (e.g., a second acoustic component 240 of FIG. 3) and a path through which moisture can penetrate. The second acoustic conduits 224 and 226 may be referred to as second acoustic guide openings or second acoustic paths or the like. The first and second acoustic conduits 223, 224, and 226 may face each other about the partition wall 225, and may confront with each other.

Figure 3:
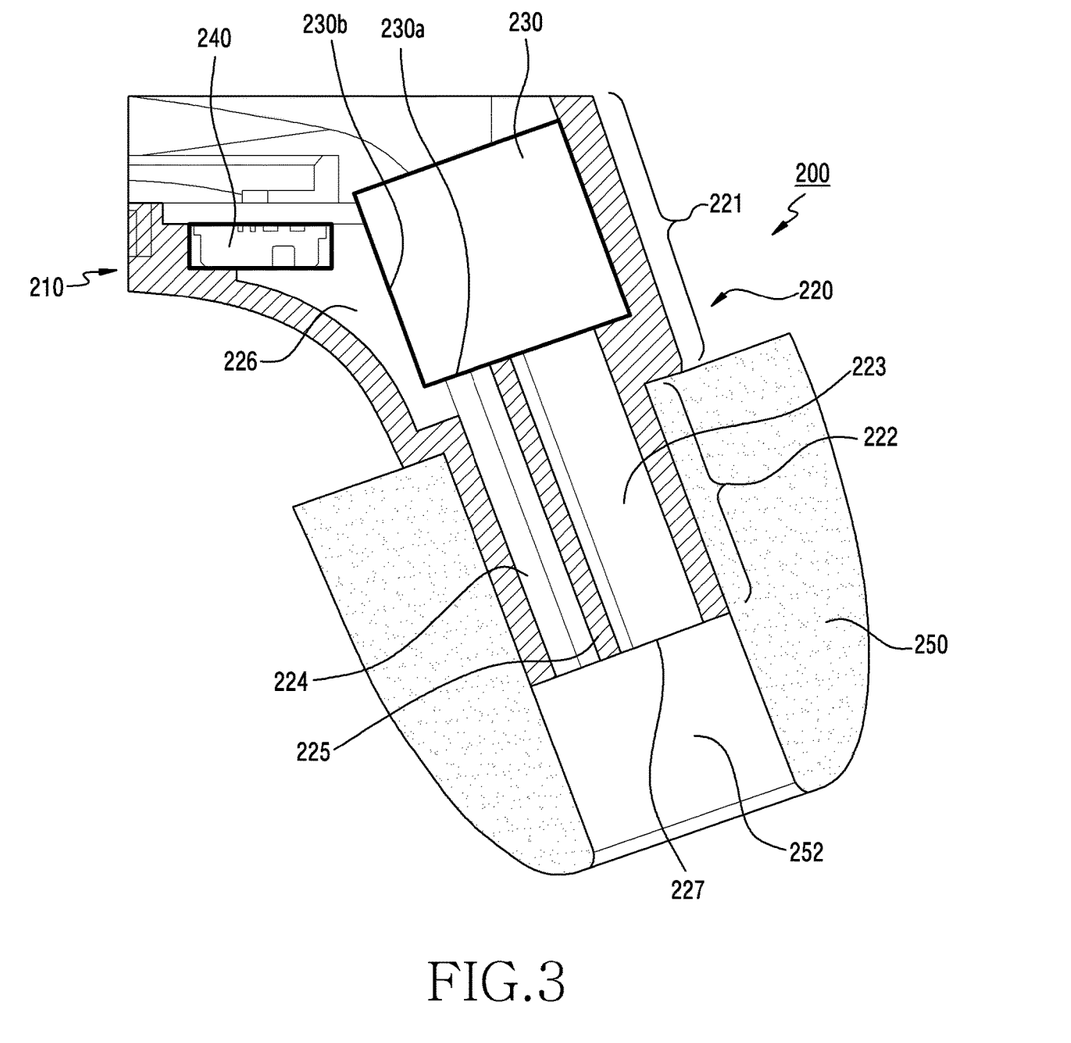
FIG. 3 is a cross-sectional view illustrating an internal structure of a wearable electronic device according to various embodiments of the present disclosure.

The neck portion 220 according to various embodiments may include a first portion 221 in which the first and second acoustic components (e.g., the first and second acoustic components 230 and 240 of FIG. 3) are disposed, and a second portion 222 coupled to at least part of an ear mold (e.g., an ear mold 250 of FIG. 3).

FIG. 3 is a cross-sectional view illustrating an internal structure of the wearable electronic device 200 according to various embodiments of the present disclosure.

Referring to FIG. 3, the wearable electronic device 200 according to various embodiments may have the plurality of acoustic components 230 and 240 mounted inside a housing. For example, the plurality of acoustic components 230 and 240 may be disposed to the first portion 221 of the neck portion 220 of the housing. In addition, an acoustic conduit of the plurality of acoustic components may be located across part of the first portion 221 and the second portion 222.

The wearable electronic device 200 according to various embodiments may include the first acoustic component 230 and the second acoustic component 240 disposed adjacent to the first acoustic component 230. The first acoustic component 230 and the second acoustic component 240 may be disposed adjacent to each other, and may be mounted integrally to the housing.

For example, the first acoustic component 230 may be a speaker module or a receiver or a thin-film speaker having a piezoelectric element. The first acoustic component 230 may be referred to as a first acoustic module, a first acoustic unit, a first acoustic unit, or the like.

The first acoustic component 230 according to various embodiments may be a vibration generating device which generates a vibration in accordance with an output of an acoustic signal, and may be a moisture discharging device which discharges moisture according to the vibration generation. For example, the first acoustic component 230 may be a vibration device which has a piezoelectric element (not shown) to generate a vibration in accordance with applying of a signal. The second acoustic component 240 according to various embodiments may be a component necessary for detecting the presence or absence of moisture penetration, and if there is foreign matter or moisture, detect the presence or absence of the moisture by identifying signal strength attenuation or a change in a frequency signal waveform or the like. The second acoustic component 240 may be referred to as a sensing unit, a sensing device, or a sensing module. The second acoustic component 240 may include a microphone. The second acoustic component 240 may be referred to as a second acoustic module, a second acoustic unit, a second acoustic portion, or the like.

The wearable electronic device 200 according to various embodiments may include the first acoustic conduit 223 in which the first acoustic component 230 is spatially coupled to the ear (inner ear), and the second acoustic conduits 224 and 226 in which the second acoustic component 240 is spatially coupled to the inner ear. For example, a sound generated from the first acoustic component 230 may be transferred to the inner ear via the first acoustic conduit 223, and the sound may be transferred to the second acoustic component 240 via the second acoustic conduits 224 and 226. If the first acoustic component 230 is a speaker or a speaker module, and the second acoustic component 240 is a microphone, then acoustic waves passing via the first and second acoustic conduits 223, 224, and 226 may travel in opposite directions from each other. In the first acoustic conduit 223, an acoustic wave emitted from the first acoustic component 230 may face the ear mold 250, and an acoustic wave entering through the ear mold 250 may face the second acoustic component 240.

One end of the first acoustic conduit 223 according to various embodiments may be spatially coupled to the first acoustic component 230, and the other end may be spatially coupled to an inner path 252 of the ear mold 250. One end of the second acoustic conduits 224 and 226 may be spatially coupled to the second acoustic component 240, and the other end may be spatially coupled to the inner path 252 of the ear mold 250. An outlet 229 of the first and second acoustic conduits may be spatially coupled to the inner path 252 of the ear mold.

Figure 4A:
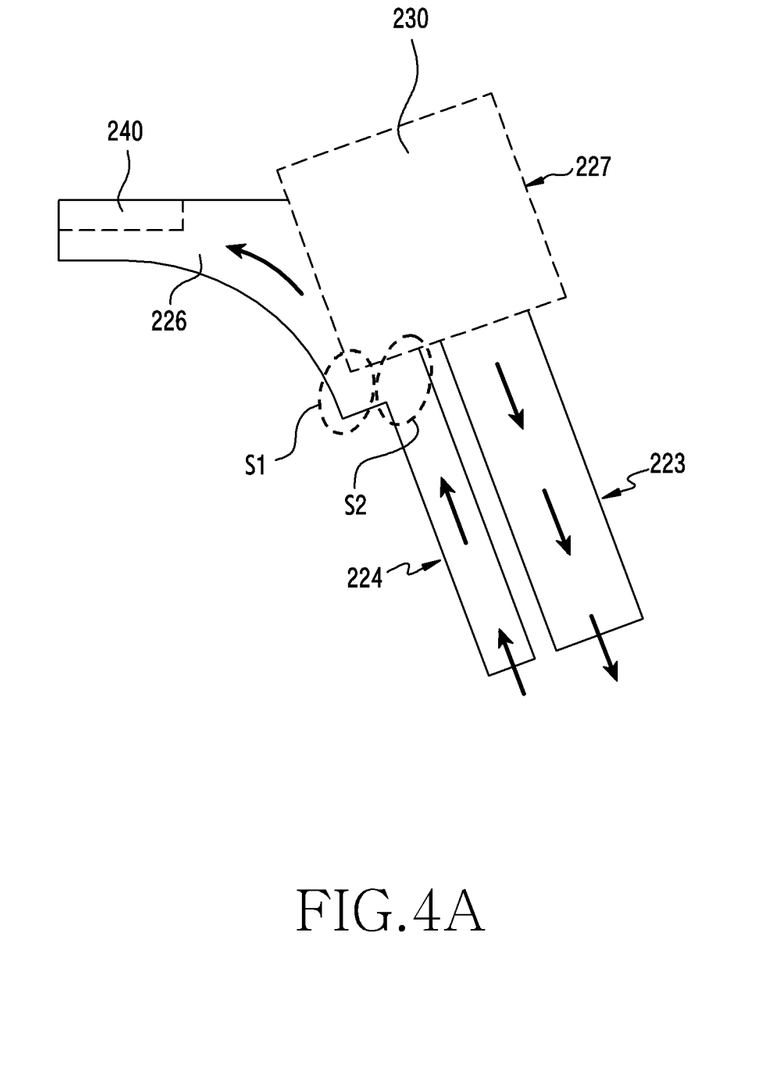
FIG. 4A is an exemplary diagram briefly illustrating a spatial arrangement inside a housing according to various embodiments of the present disclosure.
Figure 5:
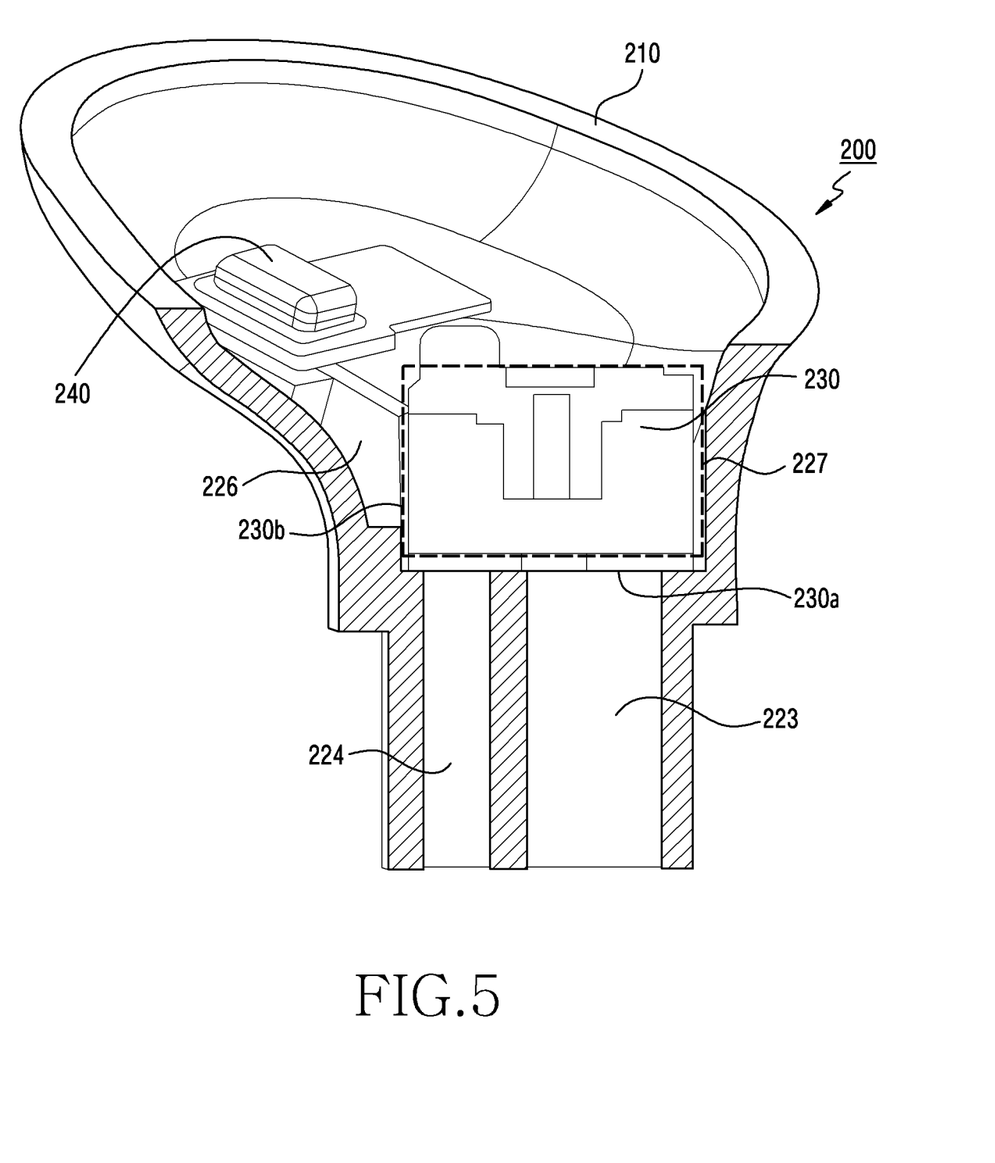
FIG. 5 is a partially exploded perspective view illustrating an internal structure of a wearable electronic device according to various embodiments of the present disclosure.

FIG. 4A is an exemplary diagram briefly illustrating a spatial arrangement inside a housing according to various embodiments of the present disclosure. FIG. 5 is a partially exploded perspective view illustrating an internal structure of the wearable electronic device 200 according to various embodiments of the present disclosure.

An arrangement relationship between first and second acoustic components and first to third acoustic conduits according to various embodiments will be described with reference to FIG. 4A and FIG. 5.

Referring to FIG. 4A and FIG. 5, the wearable electronic device 200 according to various embodiments may include a plurality of internal acoustic conduits. The first and second acoustic conduits 223, 224, and 226 may be included in the aforementioned internal space so that the first and second acoustic components 230 and 240 are coupled to respective inner ears. The first acoustic conduit 223 may be a conduit through which a sound of the first acoustic component 230 passes, and the second acoustic conduits 224 and 226 may be conduits through which a sound of the second acoustic component 240 passes. An internal space 227 may be a mounting space in which the first acoustic component 230 is mounted. The second acoustic conduit 226 may be constructed around the mounting space 227 and thus may be spatially coupled to the second acoustic conduit 224.

The first and second acoustic conduits 223, 224, and 226 according to various embodiments may be spatially isolated from each other. The internal space 227 may be spatially coupled at least in part to the first acoustic conduit 223, or may be spatially coupled at least in part to the second acoustic conduit 224, or may be isolated at least in part. For example, when the first acoustic component 230 is disposed to the internal space 227, at least part of a first face 230a of the first acoustic component 230 may be spatially coupled to the first acoustic conduit 223.

The at least part of the first face 230a of the first acoustic component 230 according to various embodiments may be in contact with at least part of the second acoustic conduit 224, and may be in contact with at least part of the second face 230b of the first acoustic component. The first face 230a may be a face facing an acoustic generation unit (not shown) of the first acoustic component 230, and a second face 230b may include a face perpendicular to the face facing the acoustic generation unit of the first acoustic component 230, for example, part of an outer peripheral face.

It may be configured to output a signal of a specified frequency so that foreign matter or moisture moves to the outside via the first and second acoustic conduits 223, 224, and 226 through an output operation of the first acoustic component 230. For example, a vibration and sound output may be generated by the output operation of the speaker module, and the foreign matter or moisture of the first and second acoustic conduits 223, 224, and 226 may move to the outside. The first acoustic conduit 223 according to various embodiments may extend linearly from part of a second portion (e.g., the second portion 222 of FIG. 3) and a first portion (e.g., the first portion 221 of FIG. 3), but without being limited thereto, may be constructed of a curved shape or the like.

The second acoustic conduits 224 and 226 according to various embodiments may include the first conduit 226 spatially coupled to the second acoustic component 240, the second conduit 224 spatially coupled to an internal path of an ear mold (e.g., the ear mold 250 of FIG. 3), and at least one or more third conduits s1 and s2 disposed between the first and second conduits 226 and 224 to change a sound travel direction.

The third conduits s1 and s2 according to various embodiments may include at least one vertical-type conduit. The third conduit may include a first vertical conduit s1 spatially coupled to the second acoustic conduit 226 and a second vertical conduit s2 spatially coupled to the second acoustic conduit 224. For example, each of the first and second vertical conduits s1 and 2 is not necessarily limited to have a vertical shape. For example, each of the first and second vertical conduits s1 and s2 may be constructed in various shapes in accordance with an arrangement of the first and second acoustic components (e.g., the first and second acoustic components 230 and 240) of the housing.

The first acoustic conduit 223 according to various embodiments may be a conduit through which moisture penetrates, and the second acoustic conduit 224 may be another conduit through which moisture penetrates. When foreign matter, e.g., moisture, penetrates through an inlet of the first acoustic conduit 223 and/or an inlet of the second acoustic conduit 224, part of the second acoustic conduit 224 and/or at least part of the first acoustic conduit 223 may be blocked by the moisture.

The wearable electronic device according to various embodiments may detect whether moisture is present by identifying signal strength attenuation or a change in a frequency signal waveform or the like when a signal input to the second acoustic component 240 has moisture, in accordance with the blocking of at least part of the second acoustic conduit 224.

The processor may recognize whether foreign matter (e.g., moisture) of the second acoustic conduit 224 is present as a sensing signal of the second acoustic component 240 is provided. In addition, whether the foreign matter of the second acoustic conduit 224 is present may also be recognized based on a user's sense of hearing. The user may recognize performance of the second acoustic component 240 in an auditory manner.

Figure 4B:
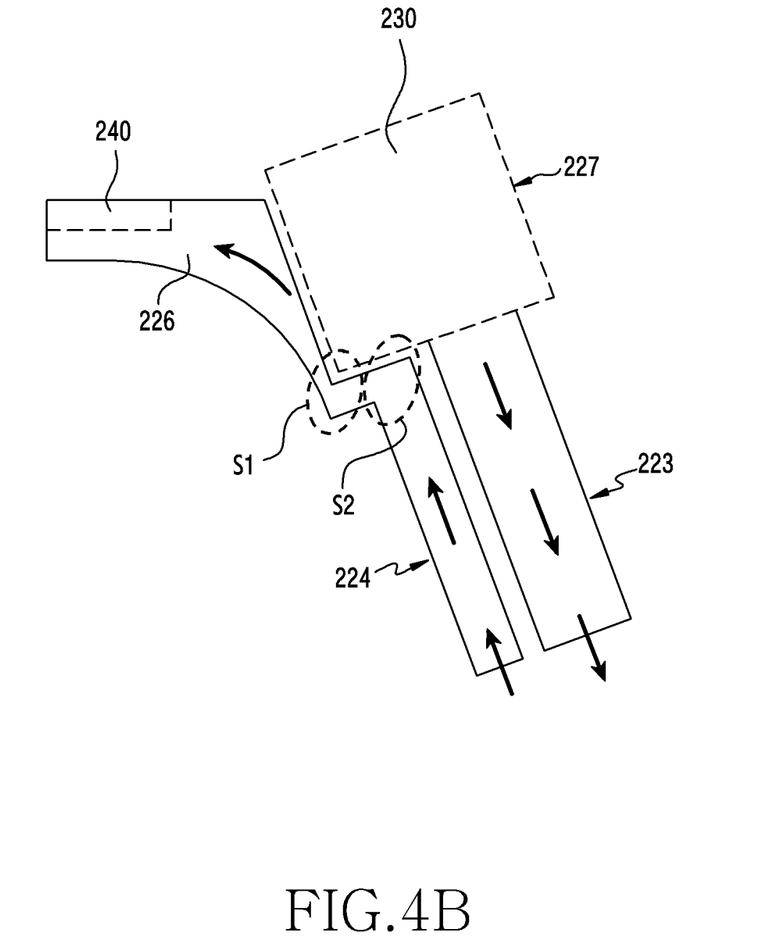
FIG. 4B is another exemplary diagram briefly illustrating a spatial arrangement inside a housing according to various embodiments of the present disclosure.

FIG. 4B is another exemplary diagram briefly illustrating a spatial arrangement inside a housing according to various embodiments of the present disclosure.

The spatial arrangement inside the housing of FIG. 4B may include a configuration related to the spatial arrangement of the housing of FIG. 4A.

The wearable electronic device 200 according to various embodiments may include a plurality of internal acoustic conduits. The first and second acoustic conduits 223, 224, and 226 may be included in the aforementioned internal space so that the first and second acoustic components 230 and 240 are coupled to respective inner ears. The first acoustic conduit 223 may be a conduit through which a sound of the first acoustic component 230 passes, and the second acoustic conduits 224 and 226 may be conduits through which a sound of the second acoustic component 240 passes. The internal space 227 may be a mounting space in which the first acoustic component 230 is mounted. The second acoustic conduit 226 may be constructed around the mounting space 227 and thus may be spatially coupled to the second acoustic conduit 224.

The first and second acoustic conduits 223, 224, and 226 according to various embodiments may be spatially isolated from each other. The internal space 227 may be spatially coupled at least in part to the first acoustic conduit 223, and may be spatially isolated from the second acoustic conduit 224.

Regarding the spatial arrangement inside the housing according to various embodiments, the mounting space 227 of the first acoustic component 230 may be disposed adjacent to the second acoustic conduits 226 and 224. The second acoustic conduits 226 and 224 may be constructed with a structure separated from the mounting space 227 by an additional partition wall (not shown). The second acoustic conduit 226 and the mounting space 227 may be spatially isolated by a partition wall (not shown).

The signal of the specified frequency may be configured to be output so that foreign matter or moisture moves to the outside via the first and second acoustic conduits 223, 224, and 226 through an output operation (e.g., shaking) of the first acoustic component 230. For example, a vibration and sound output may be generated by the output operation of the speaker module, and the foreign matter or moisture of the first and second acoustic conduits 223, 224, and 226 may move to the outside.

Figure 6:
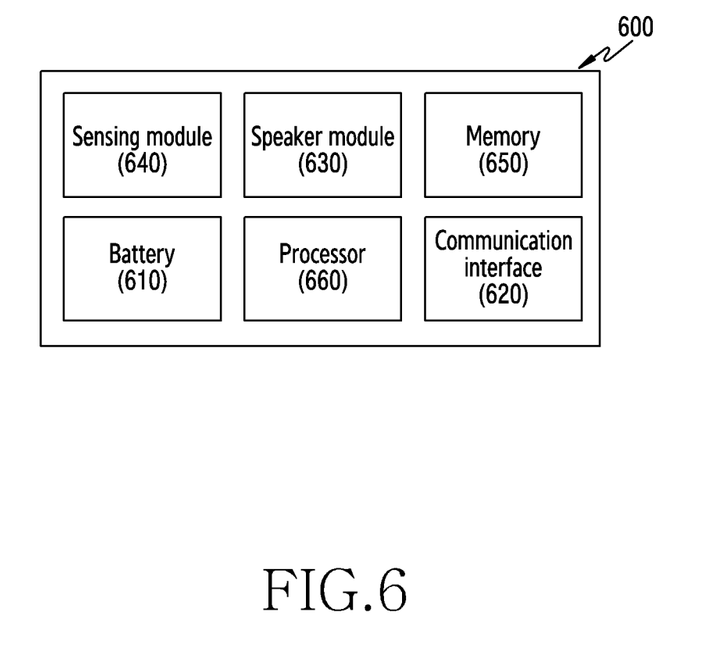
FIG. 6 is a block diagram illustrating a wearable electronic device according to various embodiments of the present disclosure.

FIG. 6 is a block diagram illustrating a wearable electronic device 600 (e.g., the wearable electronic device 200 of FIG. 2 to FIG. 5) according to various embodiments of the present disclosure.

Referring to FIG. 6, the wearable electronic device 600 according to various embodiments may include a battery 610 (e.g., the battery 189 of FIG. 1), a communication interface 620 (e.g., the communication module 190 of FIG. 1), a speaker module 630 (e.g., the acoustic output device 155 of FIG. 1), a sensing module 640 (e.g., at least one of the input device 150 and sensor module 176 of FIG. 1), a memory 650 (e.g., the memory 130 of FIG. 1), and a processor 660 (e.g., the processor 120 of FIG. 1).

The battery 610 may supply power to at least one component of the wearable electronic device 600. According to an embodiment, the battery 610 may include, for example, a primary cell which is not rechargeable, a secondary cell which is rechargeable, or a fuel cell.

The communication interface 620 may support communication with an external device (e.g., the electronic devices 120 and 104 or server 108 of FIG. 1) of the wearable electronic device 600. According to an embodiment, the communication interface 620 may include a wireless communication module (e.g., the wireless communication module 192 of FIG. 1) (e.g., a cellular communication module, a short-range wireless communication module, or a Global Navigation Satellite System (GNSS) communication module) or a wired communication module (e.g., the wired communication module 194 of FIG. 1) (e.g., a Local Area Network (LAN) communication module or a power line communication (PLC) module). A corresponding one of these communication modules may communicate with the external electronic device via the first network (e.g., the first network 198 of FIG. 1) (e.g., a short-range communication network, such as Bluetooth™, Wireless-Fidelity (Wi-Fi) direct, or Infrared Data Association (IrDA)) or the second network (e.g., the second network 199 of FIG. 1) (e.g., a long-range communication network, such as a cellular network, the Internet, or a computer network (e.g., LAN or wide area network (WAN)).

The speaker module 630 may output sound signals to the outside of the wearable electronic device 600. The speaker module 630 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The sensing module 640 may detect foreign matter inside the wearable electronic device 600. The sensing module 640 may include a microphone, and may collect sound signals from the outside of the wearable electronic device 600.

The memory 650 may store various data used by at least one component of the wearable electronic device 600. The data may include, for example, software (e.g., the program 140 of FIG. 1) and input data or output data for a command related thererto. The memory 650 may include a volatile memory for a non-volatile memory. The sensing module 640 according to various embodiments may include data for determining whether foreign matter is present by using a signal input to the sensing module 640. For example, the data for determining whether the foreign matter is present may include sound pressure for an acoustic feature, data such as a frequency characteristic, or the like. The data may include data in a signal range for a case where there is no foreign matter and data in a signal range for a case where there is foreign matter.

The processor 660 may perform various data processing or computation. The processor 660 may control at least some of functions or states related to at least one component among the components of the wearable electronic device 600. The processor 660 may determine whether foreign matter is present inside the wearable electronic device 600 via the sensing module 640. The processor 660 may determine whether foreign matter is present in a second acoustic conduit (e.g., the second acoustic conduit 224 of FIG. 3 to FIG. 5) via the sensing module 640. The processor 660 may allow the foreign matter to move inside the wearable electronic device 600. To this end, upon determining that the foreign matter is present inside the wearable electronic device 600, the processor 600 may output a signal of a specified frequency via the speaker module 630. Upon determining that the foreign matter is present in the second acoustic conduit, the processor 660 may drive the speaker module 630, and may output a signal of a specified frequency via the speaker module 630. Accordingly, at least part of the foreign matter inside the wearable electronic device 600 may move to the outside of the wearable electronic device 600 through a vibration of the speaker module 630.

Figure 7:
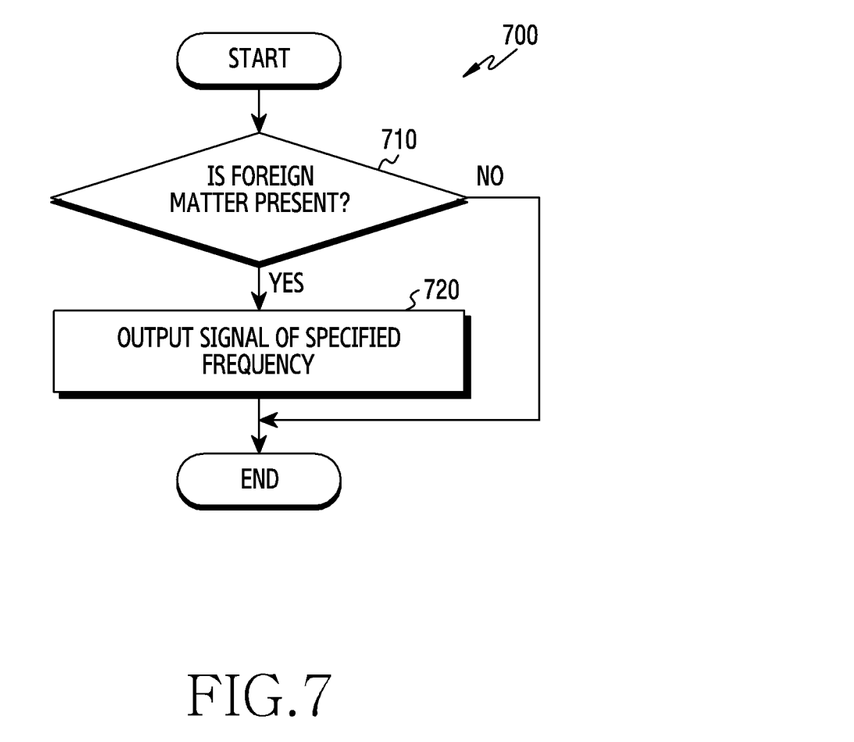
FIG. 7 is a flowchart illustrating an operating method of a wearable electronic device according to various embodiments of the present disclosure.

FIG. 7 is a flowchart illustrating an operating method 700 of a wearable electronic device 600 according to various embodiments of the present disclosure.

Referring to FIG. 7, in operation 710, the wearable electronic device 600 may determine whether foreign matter is present inside the wearable electronic device 600. According to an embodiment, the processor 660 may determine whether the foreign matter is present, based on execution of a specified function. For example, when a telephone function is executed, the processor 660 may determine whether the foreign matter is present. According to another embodiment, upon receiving specified information from the external device via the communication interface 620, the processor 660 may determine whether the foreign matter is present, based on the specified information.

According to various embodiments, the processor 660 may determine whether the foreign matter is present in the second acoustic conduit via the sensing module 640. The processor 660 may identify acoustic performance of the microphone, and may compare the acoustic performance of the microphone, for example, an acoustic feature for a microphone input signal and a specified acoustic feature. Accordingly, if the acoustic feature for the microphone input is lower than the specified acoustic feature or if the acoustic feature for the microphone input is lower than the specified acoustic feature by more than a specified difference value, the processor 660 may determine that the foreign matter is present in the second acoustic conduit. The low acoustic feature for the microphone input may imply that there is signal strength attenuation or a change in a frequency signal waveform when an input signal has moisture.

Upon determining that the foreign matter is present inside the wearable electronic device 600 in operation 710, the wearable electronic device 600 may output the signal of the specified frequency via the speaker module 630 in operation 720. Upon determining that the foreign matter is present in the second acoustic conduit, the processor 660 may drive the speaker module 630, and may output the signal of the specified frequency via the speaker module 630. With the output of the specified signal via the speaker module 630, at least part of the foreign matter inside the wearable electronic device 600 may move to the outside of the wearable electronic device 600 through a vibration of the speaker module 630. The at least part of the foreign matter inside the wearable electronic device 600 may be discharged to the outside of the wearable electronic device 600 via at least any one of the first acoustic conduit (e.g., the first acoustic conduit 223 of FIG. 3 to FIG. 5) and the second acoustic conduit through the vibration of the speaker module 630. The aforementioned movement may imply that foreign matter such as moisture is discharged to the outside of the second acoustic conduit in accordance with an acoustic wave output signal, and foreign matter such as moisture is discharged to the outside of the first acoustic conduit in accordance with the acoustic wave output signal. For example, the processor 660 may output the signal of the specified frequency via the speaker module 630 during a specified time interval. For example, the processor 660 may output the signal of the specified frequency via the speaker module 630 repetitively by a specified count. According to an embodiment, the processor 660 may output a sound of a specified frequency range, that is, an audible frequency range. According to another embodiment, the processor 660 may output the signal of the inaudible frequency range.

Figure 8:
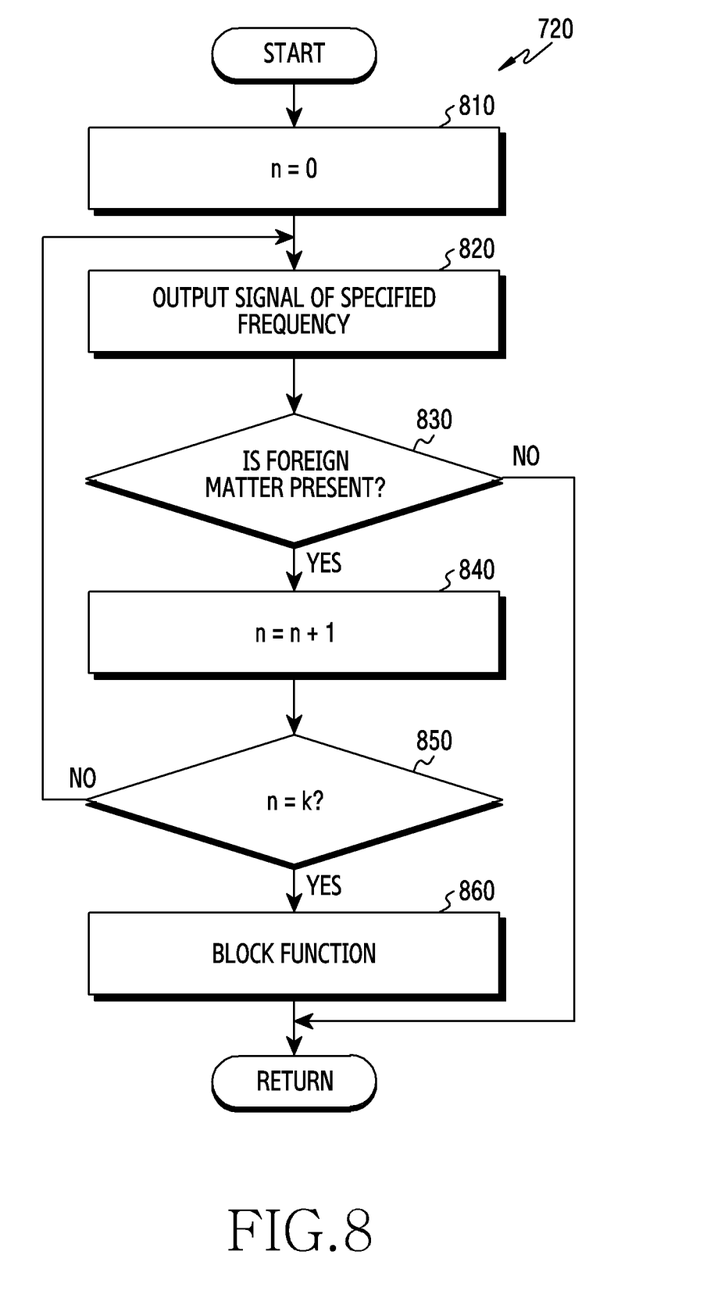
FIG. 8 is a flowchart illustrating a signal output operation of FIG. 7.

FIG. 8 is a flowchart illustrating the signal output operation 720 of FIG. 7.

Referring to FIG. 8, in operation 810, the wearable electronic device 600 may set a signal output count n to an initial value. The processor 660 may set the signal output count n to 0.

In operation 820, the wearable electronic device 600 may output a signal of a specified frequency via the speaker module 630. For example, the processor 660 may output the signal of the specified frequency via the speaker module 630 during a specified time interval. After the signal of the specified frequency is output in operation 820, the wearable electronic device 600 may determine whether foreign matter is present inside the wearable electronic device 600 in operation 830. The processor 660 may determine whether the foreign matter is present in a second acoustic conduit (e.g., the second acoustic conduit 224 of FIG. 3 to FIG. 5) via the sensing module 640.

Upon determining that the foreign matter is present inside the wearable electronic device 600 in operation 830, the wearable electronic device 600 may increase the signal output count n in operation 840. Upon determining that the foreign matter is present in the second acoustic conduit, the processor 660 may increase the signal output count n by 1. After increasing the signal output count n in operation 840, the wearable electronic device 600 may determine whether the signal output count n reaches a specified count k in operation 850. The processor 660 may determine the signal output count n and the specified count k, and may determine whether the signal output count n is equal to the specified count k.

Upon determining that the signal output count n reaches the specified count k in operation 850, the wearable electronic device 600 may block a specified function in operation 860. The processor 660 may block a function to be executed (e.g., a speaker output or telephone function), with respect to the speaker module 630 and a microphone of the sensing module 640. According to various embodiments, if the specified function is blocked in the wearable electronic device 600, an external device (e.g., the electronic devices 102 and 104 of FIG. 1) may stop transmission of a signal for the specified function to the wearable electronic device 600, and may start transmission of a signal to another path. For example, if the wearable electronic device 600 blocks the telephone function, the external device may activate a speakerphone function. Accordingly, the external device may output a signal via a speaker of the external device, instead of transmitting the signal to the wearable electronic device 600.

Upon determining that the signal output count n does not reach the specified count k in operation 850, the wearable electronic device 600 may return to operation 820. Accordingly, the wearable electronic device 600 may repeat at least any one of operations 820 to 850.

Upon determining that the foreign matter is not present inside the wearable electronic device 600 in operation 830, the wearable electronic device 600 may execute the specified function. The processor 860 may maintain a function to be executed, for example, a telephone function. The processor 860 may execute the telephone function via the speaker module 630 and the microphone of the sensing module 640.

Various embodiments of the present disclosure disclosed in the present specification and the drawing are merely a specific example presented for clarity and are not intended to limit the scope of the embodiments of the present disclosure. Therefore, in addition to the embodiments disclosed herein, various changes in forms and details made without departing from the technical concept of the various embodiments of the present disclosure will be construed as being included in the scope of the various embodiments of the present disclosure.

The invention claimed is:

1. An electronic device comprising:
   a housing;
   a speaker module disposed inside the housing and coupled to the outside of the electronic device;
   a sensing module disposed inside the housing and coupled to the outside of the electronic device; and
   a processor coupled to the sensing module and the speaker module,
   wherein the processor is configured to:
      determine whether foreign matter is present via the sensing module; and
      output a signal of a specified frequency range via the speaker module so that at least part of the foreign matter moves to the outside, based on the sensing result,
   wherein the housing comprises:
      a first acoustic conduit coupled to the speaker module; and
      a second acoustic conduit coupled to the sensing module,
   wherein whether foreign matter of the second acoustic conduit is present is determined via the sensing module, and
   wherein moisture which has penetrated to at least part of the first acoustic conduit or second acoustic conduit is discharged through a vibration of the speaker module.

2. The electronic device of claim 1, further comprising a communication interface,
   wherein the processor is configured to:
      receive specified information by using the communication interface; and
      output sound of the specified frequency range via the speaker module, based at least one the specified information.

3. The electronic device of claim 1,
   wherein the sensing module comprises a microphone, and
   wherein the processor compares acoustic performance of the microphone with specified acoustic performance via the sensing module, and determines the presence/absence of moisture penetration, based at least on the comparison.

4. The electronic device of claim 1, wherein upon detecting moisture penetration via the sensing module, the processor discharges at least part of the penetrated moisture through a vibration of the speaker module.

5. The electronic device of claim 1, wherein at least part of the second acoustic conduit comprises at least one conduit having a substantially vertical shape.

6. The electronic device of claim 1, wherein the housing comprises:
   a main body; and
   a neck portion extending to be gradually thinly from the main body,
   wherein the speaker module and the sensing module are disposed adjacent to each other in the neck portion, and each of the first acoustic conduit and the second acoustic conduit extends from an inlet of the neck portion to an outlet thereof.

7. The electronic device of claim 1, further comprising a water repellent structure, wherein the water repellent structure is configured such that moisture which has penetrated through the second acoustic conduit is detected via the sensing module, and moisture which has penetrated to the second acoustic conduit or the first and second acoustic conduits is discharged through a vibration of the speaker module according to the detection of the moisture penetration.

8. A method comprising:
   determining whether foreign matter is present in a second acoustic conduit via a sensing module disposed inside a housing comprising a first acoustic conduit and the second acoustic conduit; and
   outputting a signal of a specified frequency range via a speaker module disposed inside the housing so that at least part of the foreign matter moves to the outside of the housing, based on the sensing result.

9. The method of claim 8, wherein the determining comprises:
   receiving specified information from an external device; and
   determining whether the foreign matter is present, based on the specified information.

10. The method of claim 9, wherein the outputting comprises outputting sound of the specified frequency range to at least any one of a first acoustic conduit and a second acoustic conduit, via the speaker module.

11. The method of claim 8,
wherein the sensing module comprises a microphone, and wherein the determining comprises:
comparing acoustic performance of the microphone with specified acoustic performance; and
determining whether the foreign matter is present, based on the comparison result.

12. The method of claim 8, wherein in the outputting, the signal of the specified frequency range is output repeatedly by a predetermined number.

13. The method of claim 8, further comprising:
after outputting the signal of the specified frequency range, determining whether the foreign matter is present in the second acoustic conduit via the sensing module; and
if the foreign matter is not present in the second acoustic conduit, executing a specified function.

14. The method of claim 13, further comprising, if the foreign matter is present in the second acoustic conduit, blocking the function so that the function is executed in an external device.

* * * * *